(12) United States Patent
Flehmig et al.

(10) Patent No.: US 10,035,179 B2
(45) Date of Patent: Jul. 31, 2018

(54) APPARATUS AND METHOD FOR THE CONTINUOUS AND PROGRESSIVE SHAPING OF METAL STRIPS TO GIVE A PROFILE WITH LONGITUDINALLY VARYING CROSS SECTION

(71) Applicants: THYSSENKRUPP STEEL EUROPE AG, Duisburg (DE); THYSSENKRUPP AG, Essen (DE)

(72) Inventors: Thomas Flehmig, Ratingen (DE); Thomas Großerüschkamp, Duisburg (DE)

(73) Assignees: THYSSENKRUPP STEEL EUROPE AG, Duisburg (DE); thyssenkrupp AG, Essen (DE)

( * ) Notice: Subject to any disclaimer, the term of this patent is extended or adjusted under 35 U.S.C. 154(b) by 0 days.

(21) Appl. No.: 14/919,428

(22) Filed: Oct. 21, 2015

(65) Prior Publication Data

US 2016/0114366 A1    Apr. 28, 2016

(30) Foreign Application Priority Data

Oct. 23, 2014   (DE) .......................... 10 2014 115 426

(51) Int. Cl.
*B23K 31/02*     (2006.01)
*B21C 37/08*     (2006.01)
(Continued)

(52) U.S. Cl.
CPC ........ *B21C 37/0803* (2013.01); *B21C 37/155* (2013.01); *B21C 37/16* (2013.01); *B21D 5/12* (2013.01); *B23K 31/027* (2013.01)

(58) Field of Classification Search
CPC .......... B23K 9/0052; B23K 2201/04–2201/10; B23K 9/0253; B23K 11/062;
(Continued)

(56) References Cited

U.S. PATENT DOCUMENTS

| 989,508 A | 4/1911 | Lewis |
| 2,417,594 A * | 3/1947 | Fleche ................. B23K 11/062 |
| | | 219/61.4 |

(Continued)

FOREIGN PATENT DOCUMENTS

| CN | 1144147 A | 3/1997 |
| CN | 200977533 Y * | 11/2007 |

(Continued)

OTHER PUBLICATIONS

English translation of abstract of DE 102007005880 (B4).
(Continued)

*Primary Examiner* — Kiley Stoner
(74) *Attorney, Agent, or Firm* — Lathrop Gage L.L.P.

(57) ABSTRACT

Disclosed herein is an apparatus for the continuous and progressive shaping of metal strips to produce a formed metal strip whose cross sectional dimensions vary along a longitudinal axis thereof. The apparatus includes a device for shaping the metal strips, wherein the device has at least one tool set with at least two rotatably mounted and mutually associated tools, wherein the tools each have a pressure face disposed along an outer circumference thereof with a contour configured to shape the workpieces. The contour of the pressure face of at least one tool is not axially symmetric. In order to be able to cost-effectively produce workpieces or profiles with a variable cross section, in particular profiles with a closed cross section, it is proposed that the contours of the pressure faces of all tools, but at least of one tool set, are concave in order to generate a profile having a closed cross section.

14 Claims, 7 Drawing Sheets

(51) Int. Cl.
*B21C 37/15* (2006.01)
*B21C 37/16* (2006.01)
*B21D 5/12* (2006.01)

(58) Field of Classification Search
CPC .............. B23K 11/066; B23K 11/0873; B23K 11/0935; B23K 13/025; B23K 13/046; B23K 26/262; B23K 26/282; B23K 37/00; B23K 31/02; B23K 31/027; B21B 13/02; B21D 5/12; B21C 37/155; B21C 37/0803; B21C 37/16
USPC .. 228/173.1, 173.4, 173.6, 173.7, 17.5, 155, 228/15.1, 170–172; 219/59.1–61; 72/224–225
See application file for complete search history.

(56) References Cited

U.S. PATENT DOCUMENTS

| | | | | |
|---|---|---|---|---|
| 2,418,312 A * | 4/1947 | Michelman | B21C 37/18 | 228/160 |
| 2,823,294 A * | 2/1958 | Crawford | B21C 37/08 | 219/59.1 |
| 3,444,715 A * | 5/1969 | Sellars | B21C 37/18 | 72/285 |
| 3,452,424 A * | 7/1969 | Morris | B21C 37/185 | 219/67 |
| 3,481,025 A * | 12/1969 | Eckhardt | B21C 37/12 | 138/172 |
| 3,535,484 A * | 10/1970 | Pegues | C21D 9/50 | 148/521 |
| 3,572,078 A | 3/1971 | Kennedy et al. | | |
| 3,648,008 A | 3/1972 | Kawato et al. | | |
| 3,808,864 A * | 5/1974 | Bennet | B21B 1/18 | 72/235 |
| 4,135,344 A * | 1/1979 | Seragnoli | B65B 19/32 | 209/535 |
| 4,282,996 A * | 8/1981 | Maeda | B23D 19/06 | 225/2 |
| 4,299,108 A * | 11/1981 | Kato | B21D 5/10 | 228/147 |
| 4,500,372 A * | 2/1985 | Mion | B26D 7/086 | 156/251 |
| 4,568,015 A * | 2/1986 | Toyooka | B21C 37/08 | 219/614 |
| 4,709,845 A | 12/1987 | Akiyama et al. | | |
| 4,906,228 A * | 3/1990 | Reifenhauser | B65D 33/02 | 493/11 |
| 5,607,098 A * | 3/1997 | Kusakabe | B21B 13/103 | 228/17 |
| 5,827,994 A * | 10/1998 | Gladden | C06C 5/04 | 102/275.1 |
| 5,878,614 A * | 3/1999 | Okamoto | B21C 37/08 | 72/178 |
| 5,904,061 A * | 5/1999 | Engel | B21B 1/14 | 72/225 |
| 6,333,482 B1 * | 12/2001 | Sauer | B21D 51/2669 | 219/121.63 |
| 6,865,918 B2 | 3/2005 | Waldrop | | |
| 2005/0014015 A1 * | 1/2005 | Hauger | B21C 37/02 | 428/600 |
| 2005/0257591 A1 * | 11/2005 | Hauger | B21C 37/185 | 72/368 |
| 2007/0180881 A1 * | 8/2007 | Ingvarsson | B21D 5/08 | 72/169 |
| 2007/0193013 A1 * | 8/2007 | Mellas | B21C 37/065 | 29/421.1 |
| 2008/0209715 A1 * | 9/2008 | Kenmochi | B21C 37/083 | 29/700 |
| 2009/0025446 A1 * | 1/2009 | Ingvarsson | B21D 5/083 | 72/177 |
| 2009/0266132 A1 * | 10/2009 | McDonald | B21H 1/20 | 72/235 |
| 2011/0247715 A1 * | 10/2011 | Ishiguro | B21C 37/08 | 138/177 |
| 2012/0090372 A1 * | 4/2012 | Nillies | B21C 37/26 | 72/85 |
| 2012/0160006 A1 * | 6/2012 | Travini | B21D 5/12 | 72/133 |
| 2013/0036784 A1 * | 2/2013 | Marin | B21B 13/10 | 72/224 |
| 2015/0322842 A1 * | 11/2015 | Homma | B21D 5/12 | 29/890.08 |
| 2015/0343507 A1 * | 12/2015 | Deley, Jr. | B21C 37/0822 | 219/61.3 |
| 2016/0016264 A1 * | 1/2016 | Deley, Jr. | B23K 11/063 | 29/428 |
| 2016/0023256 A1 * | 1/2016 | Li | B21B 13/02 | 72/234 |

FOREIGN PATENT DOCUMENTS

| | | | | |
|---|---|---|---|---|
| CN | 1013000090 A | 11/2008 | | |
| CN | 102728707 A | 10/2012 | | |
| DE | 546742 C | 3/1932 | | |
| DE | 1752657 A | 5/1971 | | |
| DE | 3423706 C2 | 9/1985 | | |
| DE | 19754171 A1 | 6/1999 | | |
| DE | 10011755 A1 | 9/2001 | | |
| DE | 102007005880 B4 | 10/2009 | | |
| GB | 264534 A | 6/1927 | | |
| JP | 78045180 B * | 12/1978 | | |
| JP | 59027722 A | 2/1984 | | |
| JP | 63030102 A * | 2/1988 | | |
| JP | 64002704 A * | 1/1989 | | |
| JP | 01228613 A * | 9/1989 | | |
| JP | 01299713 A * | 12/1989 | | |
| JP | 02034208 A * | 2/1990 | | |
| JP | 03189001 A * | 8/1991 | | |
| JP | H11-77149 A | 3/1999 | | |
| JP | 2000-202943 A * | 7/2000 | | |
| JP | 2001300754 A * | 10/2001 | ......... B23K 26/0846 | |
| JP | 2001-353520 A | 12/2001 | | |
| JP | 2005-040046 A * | 2/2005 | | |
| KR | 101416940 B1 * | 7/2014 | | |
| WO | WO 2006111194 A1 * | 10/2006 | ............. B31D 1/021 | |

OTHER PUBLICATIONS

English translation of abstract of DE 19754171 (A1).
English translation of abstract of DE 10011755 (A1).
English translation of abstract of JP 59027722 (A).
English language machine translation for DE546742C listed above.
English language Abstract for JP2001-353520A listed above.
English language Abstract for JPH1177149A listed above.
English language Abstract for CN1144147A listed above.
English language Abstract for CN102728707A listed above.

* cited by examiner

APPARATUS AND METHOD FOR THE CONTINUOUS AND PROGRESSIVE SHAPING OF METAL STRIPS TO GIVE A PROFILE WITH LONGITUDINALLY VARYING CROSS SECTION

CROSS-REFERENCE TO RELATED APPLICATIONS

This application claims priority to prior filed German Patent Application Serial No. 102014115426.6 filed Oct. 23, 2014, the entire contents of which is hereby incorporated by reference herein.

FIELD

This disclosure relates to an apparatus for the continuous and progressive shaping of metal strips to give a profile with longitudinally varying cross section.

BACKGROUND

Within the field of shaping technology many possibilities are known for shaping metal strips into profiles. "Roll forming", sometimes also termed "roller profiling", is particularly well-suited to continuous, progressive shaping. This is a shaping method in which rotatably mounted tools, for example rolls or rollers, shape the metal strip into profiles. To that end, the rotatably mounted tools are usually arranged in a fixed position while the metal strips to be shaped are continuously moved through the rollers. During the movement of the metal strips, the rotatably mounted and driven tools roll on the metal strips and deform the metal strips by pressing against one another. Often, multiple stations with different-shaped tools are arranged in series such that the metal strips are shaped step-by-step until the desired final cross-section is reached. Roll forming is particularly well-suited to the production of profiles having constant cross sections.

In comparison to other shaping methods (e.g. pressing), roll forming generates relatively high shaping pressures only locally. A great advantage of roll forming lies in the possibility of continuously shaping the metal strips. A further advantage is a high reproducibility of the results. Against this backdrop, the use of roll forming, in particular for the production of large numbers of identical components, is to be considered advantageous, for example for bodywork parts for motor vehicles.

Apparatuses and methods for roll forming are known for example from DE 10 2007 005 880 B4, DE 197 54 171 A1 and DE 100 11 755 A1. With some of the apparatuses and methods described therein, it is possible to generate by roll forming metal strips whose cross sections vary along their longitudinal axis. This is for example achieved by changing or adjusting the position of the tools in the lateral direction during the shaping procedure. In particular, the tools can not only rotate but also execute lateral translational movements. The changing cross sections make it possible for components produced therefrom to be adapted to the loads prevailing in operation.

The known solutions have the disadvantage that great expenditure in terms of machinery is required in order to make the tools—for example a roller set—laterally displaceable. In addition, displaceably mounted tools require a complex control which ensures that the tools always adopt the correct position. A further drawback lies in the fact that only displacing the tools permits only a limited variation in the workpiece geometry or profile geometry.

Another possibility for producing workpieces or profiles having a longitudinally varying cross section by roll forming is known from JP 59 027 722 A. That document proposes, instead of changing the position of the tools, using rotatably mounted tools whose contours are not axially symmetric. In this manner, the metal strips are deformed such that the shape of the metal strips after the shaping procedure approximately corresponds to the shape of the contours of the tools. To that end, two rollers with matching contours and parallel axes of rotation are employed against one another, between which rollers the metal strip is guided and shaped.

Although this solution is simpler in terms of construction, it does have the drawback that the described tools, whose axes of rotation are parallel to one another, do not make it possible to generate hollow profiles, but rather only open profiles or half-shells, and in order to produce hollow profiles two or more half-shells must be joined together. This in turn increases production costs. A further drawback of the solution known from JP 59 027 722 A lies in the fact that, in order to form the open profiles, two tools having different contours are used (a convex "punch" and a concave "die"). This also leads to higher tooling costs.

SUMMARY

Described herein is an apparatus and method for the continuous and progressive shaping of metal strips to give a profile with longitudinally varying cross section. The apparatus includes at least one tool set having at least two rotatably mounted and mutually associated tools, wherein the tools have a circumferential pressure face in the circumferential direction with a contour for shaping the metal strips, wherein the contour of the pressure face of at least one tool is not axially symmetric. The method includes a) providing an apparatus having at least two rotatably mounted and mutually associated tools, and b) shaping the metal strips by means of the tools.

Accordingly, one objective of the present disclosure is to provide an apparatus that will permit the cost-effective production of workpieces or profiles having a longitudinally varying cross section, in particular longitudinally varying profiles having a closed cross section. This objective may be achieved at least in part by having an apparatus as disclosed herein, in which the contours of the pressure faces of the tools in one or more tool sets are concave in order to generate a profile having a closed cross section.

Other embodiments, objects, features and advantages will be set forth in the detailed description of the embodiments that follows, and in part will be apparent from the description, or may be learned by practice, of the claimed invention. These objects and advantages will be realized and attained by the processes and compositions particularly pointed out in the written description and claims hereof. The foregoing Summary has been made with the understanding that it is to be considered as a brief and general synopsis of some of the embodiments disclosed herein, is provided solely for the benefit and convenience of the reader, and is not intended to limit in any manner the scope, or range of equivalents, to which the appended claims are lawfully entitled.

BRIEF DESCRIPTION OF THE DRAWINGS

The present invention is described in detail below with reference to the attached drawing figures, wherein.

DETAILED DESCRIPTION

An apparatus of the present disclosure is an apparatus for the continuous and progressive shaping of metal strips to give a profile with longitudinally varying cross section. Continuous and progressive shaping refers to the possibility of uninterrupted shaping of the metal strips until these reach their final shape. The material used can be steel, magnesium, aluminum or other metals or combinations thereof, for example in the form of multi-layer materials. The thickness of the shaped workpieces or profiles can lie in the range between 0.3 mm and 6 mm. The apparatus is first characterized by a device for shaping the metal strips. This device comprises at least one tool set with at least two rotatably mounted and mutually associated tools. These tools can for example be rolls or rollers. The tools have a circumferential pressure face in the circumferential direction with a contour for shaping the metal strips. The pressure face runs about the axis of rotation of the tool and its cross-sectional surface is termed the contour. The contour of the pressure face of at least one tool is not axially symmetric. This can be achieved in that the contour changes as seen in the circumferential direction and serves the purpose of producing workpieces or profiles having a longitudinally varying cross section.

According to the invention, the contours of the pressure faces of all tools, but at least of one tool set, are concave in order to generate a profile having a closed cross section. A concave shape is to be understood in particular as a largely inward-curved, that is to say "holed" shape. The concave shape of the contours of the pressure faces are particularly good for shaping the metal strips to give a longitudinally varying, closed profile having a longitudinal slot ("slotted profile"), since the outer surface of a closed profile, for example a circular profile, accordingly has a convex—that is to say outward-curved-shape. The generation of hollow profiles from an undivided metal strip has the substantial advantage that only one longitudinal seam results and need be welded or otherwise closed in order to generate a completely closed hollow profile. By contrast, known roll forming methods for the production of longitudinally varying profiles usually only generate profiles that are open on one side, of which two or more are joined together to give a hollow profile. To that end, however, it is necessary to weld two or more longitudinal seams, which both increases costs and also worsens the mechanical properties of the finished profiles. Insofar as multiple tool sets are provided, the contours of the pressure faces of the tools of all tool sets can be largely concave in shape.

One configuration of the apparatus is characterized by at least one tool set with in each case at least two rotatably mounted and mutually associated tools. The use of further tool sets makes it possible to shape the metal strips in further, more differentiated steps, such that it is possible to achieve relatively large changes in cross section over the profile length. In this case, the metal strips can first, by means of at least one first tool set, be shaped to give a profile ("U profile") which is open on one side and which does not change longitudinally, having essentially vertical legs and where necessary rounded edges. In that context, preferably the smallest radius and/or at least partially the smallest half cross section dimension of the final geometry to be generated dictate the shape of the profile which is open on one side and is longitudinally constant. An at least second, downstream tool set then further shapes, continuously, the profile which is open on one side and is longitudinally constant to give a longitudinally varying closed profile having a longitudinal slot.

According to one embodiment of the apparatus, it is provided that each tool set comprises two, three or four rotatably mounted tools. Using multiple tools makes it possible to shape the pre-shaped metal strips simultaneously from different sides, and thus in particular to generate closed hollow profiles with longitudinally varying cross sections. In the case of two tools, the axes of rotation of the tools are preferably arranged parallel to one another. In the case of three tools, the axes of rotation of adjacent tools preferably enclose an angle of 120°, and in the case of four tools the axes of rotation of adjacent tools preferably enclose an angle of 90°. This leads to an even distribution of the shaping action of the tools on the shaping of pre-shaped metal strips to give closed profiles having a longitudinal slot.

In a further embodiment of the invention, it is provided that the contour of the pressure face of at least one tool is largely in the form of an arc of a circle, or angular or oval, in particular elliptical. A design in the form of an arc of a circle refers in particular to a shape corresponding to a section of a circle (e.g. a semicircle, quarter-circle, etc.). An angular design refers in particular to a shape having multiple largely straight and where necessary equal-length part lengths arranged at an angle to one another (e.g. a triangle, a quadrilateral, a hexagon, etc.). In corresponding fashion, an oval or elliptical design refers in particular to a shape corresponding to a section of an oval or of an ellipse. This design for the contours permits the production of closed profiles having a circular, angular or oval cross-section, or combinations thereof.

Further to this configuration, in particular to the configuration in the form of an arc of a circle, it is proposed that the radius of the contour of the pressure face of at least one tool changes in the circumferential direction between a minimum radius and a maximum radius. This design for the contours permits the production of closed profiles having a longitudinally varying circular cross section.

Further to this configuration, in particular to the angular configuration, it is proposed that the part lengths of the respective cross section face of the contour of the pressure face of at least one tool set changes in the circumferential direction between minimum lengths and maximum lengths. This design for the contours permits the production of closed profiles having a longitudinally varying angular cross section with varying part lengths.

According to a further embodiment of the apparatus, it is provided that the contours of the pressure faces of the tools of at least one tool set, positioned facing one another, result in a circumferential overall contour having an opening. The in particular pre-shaped metal strips are fed through the opening. Thus, the tools not only shape the metal strips but also position and guide them during shaping. The opening can for example be circular, angular or oval (in particular elliptical) in shape.

In a further configuration, the apparatus can be supplemented by upstream-connected devices for unwinding and, if necessary, straightening, and for cutting the metal strips. These devices can be used to match the evenness, the shape and the respective breadth of the metal strips to the final geometry to be achieved. In particular in the production of profiles having greatly varying cross sections, it is possible to precisely match the breadth of the metal strips to the circumferences to be achieved. For example, this results in wave-like contours. The metal strips can for example be cut using a laser beam. Alternatively, rotatably mounted tools such as cutting rollers can be used, for example a blade roller and a support roller.

According to a further embodiment, the apparatus can be supplemented by a downstream-connected device for welding the closed metal strips. This is in particular necessary for the production of completely closed profiles, since such profiles, when produced by roll forming, always have at least one longitudinal seam. Integrating the welding device in the apparatus also makes it possible for the welding to be carried out continuously and simultaneously with the shaping, such that it is possible to dispense with a subsequent welding. The device for welding the closed metal strips is preferably height-adjustable, in order to be able to ensure in each case a constant distance with respect to the longitudinal seam.

The apparatus can be supplemented by a further downstream-connected device for post-shaping the closed, in particular fully closed, metal strips. This is necessary in particular for the production of accurate-shape profiles, or if a final shaping to give the desired final geometry is possible only in the closed and welded (fully closed) state. The embodiment of this device corresponds essentially to that of the shaping first tool set which is used for closing the open, pre-shaped metal strip, wherein the contour of the pressure faces of the (post-shaping) tools is matched to the final geometry which is to be set for the profile.

The apparatus can be supplemented by a further downstream-connected device for separating the closed, in particular fully closed, metal strips. Using this device, the closed metal strip (profile strand) is cut to the desired length. This is preferably a "flying" separating device, preferably a saw, which can move during the separating procedure, along the longitudinal axis and with the same speed as the profile strand.

The object described in the introduction is also achieved with a method for the continuous and progressive shaping of metal strips to give a profile with longitudinally varying cross section, comprising the following steps: a) providing an apparatus having at least two rotatably mounted and mutually associated tools, and b) shaping the metal strips by means of the tools. The material used can be steel, magnesium, aluminum or other metals or combinations thereof, for example in the form of multi-layer materials, and the tools used can for example be rolls or rollers.

According to the invention, the method provides that, in step b), the metal strips are shaped by the tools so as to form a closed hollow profile (closed metal strip) having a longitudinal slot. As has already been described in relation to the apparatus, the method is also based on the idea of producing, from a metal strip and exclusively by continuous and progressive shaping procedures, a closed, longitudinally varying hollow profile having a longitudinal slot. This has the advantage of needing to be supplemented by only one subsequent production step, namely closing, in particular welding of the longitudinal slot. Preferably, in that context, the two edges of the closed metal strip abut as tightly as possible against one another ("edge abutment"). This permits welding by means of a laser. In the case of gap widths of up to 2 mm, it is for example possible to use induction or conduction welding methods.

One configuration of the method according to the invention provides that, in step a), there is provided an apparatus according to one of claims 1 to 11. In all of the configurations represented, the above-described apparatus is particularly well-suited to carrying out the method since the largely concave shape of the contours of the pressure faces represents a structurally simple way of producing closed hollow profiles (closed metal strips) having a longitudinal slot.

According to a further configuration of the method according to the invention, it is provided that step b) comprises the following part steps: b1) shaping the metal strips to give a profile which is open on one side and which does not change longitudinally ("U profile"), having essentially vertical legs, wherein the smallest radius and/or the at least partially smallest half cross section dimension of the final geometry is introduced, and b2) further shaping the profile which is open on one side to give a closed hollow profile (closed metal strip) having a longitudinal slot. More complex geometries can be achieved using a multi-stage procedure.

Further to this configuration, it is proposed that part steps b1) and b2) are carried out on separate tool sets, each having at least two mutually associated and rotatably mounted tools. It is also possible, by using tool sets with developing profile end shape, to produce closed hollow profiles (closed metal strips) having complex geometry.

According to one configuration, the method can be supplemented by the following steps, which are carried out prior to step b): ba) unwinding and, if necessary, straightening, and cutting the metal strips. As has already been described for the apparatus, unwinding and, if necessary, straightening, and cutting serves to adapt the metal strips to the final geometry to be achieved. In that context, cutting can for example be carried out using a laser beam or by means of rotatably mounted cutting tools such as cutting rollers.

Equally, the method can further be supplemented by the following step, which is carried out after step b): c) welding the closed metal strips along the longitudinal slot. Welding the longitudinal slot permits continuous production of fully closed metal strips (profile strands) simultaneously with the shaping, such that it is possible to dispense with a subsequent welding.

Finally, the method can be supplemented by the following steps, which are carried out after step c): d) shaping/post-shaping the welded metal strip (profile strand/hollow profile strand) with at least two mutually associated and rotatably mounted tools in a tool set, and e) cutting into lengths to give individual profiles. This subsequent shaping makes it possible to ensure a particularly precise final geometry since undesirable deformations—which might have arisen during welding—can be corrected. It is equally possible that the subsequent shaping can also produce the final geometry to be generated, i.e. that the above-described shaping tools merely generate a pre-form which is welded and then the final geometry is produced or set by the shaping.

The present disclosure is further described in further detail below with reference to the drawing figures representing various embodiments of the concepts disclosed herein.

Figure 1A:
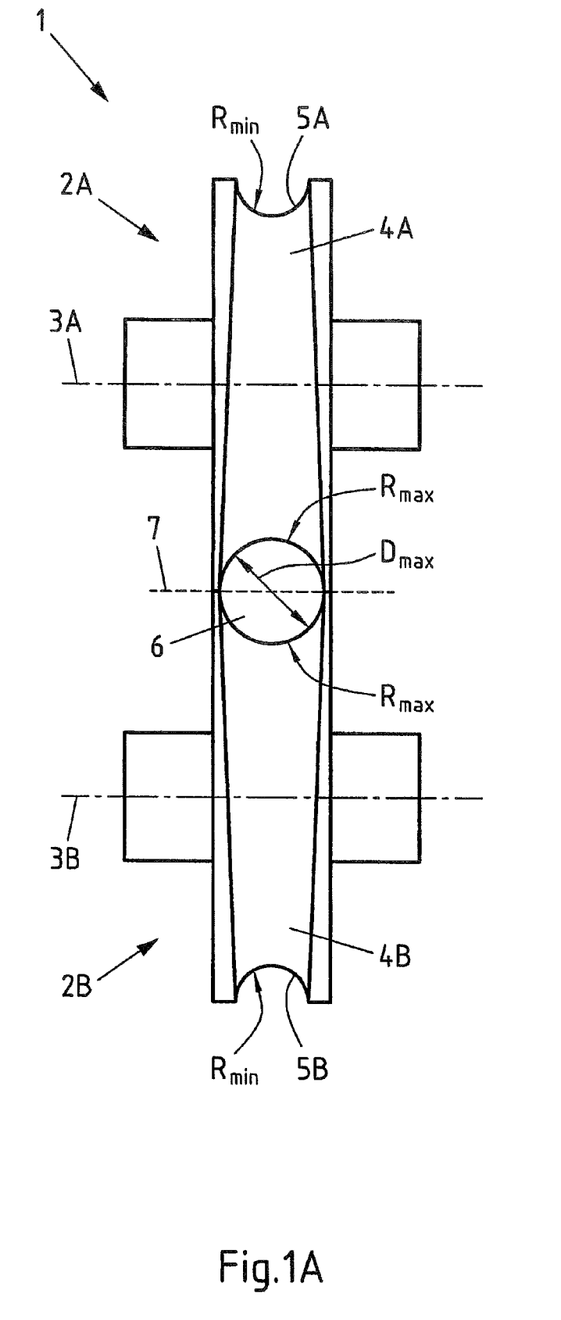
FIG. 1A is a front end plan view of a first embodiment of a tool set for an apparatus of the present disclosure, showing two rollers with each roller having a circumferential pressure face that varies in shape about the length of the circumference of each roller.

FIG. 1A shows a first configuration of a tool set 1 for an apparatus according to the invention. The tool set 1 shown in FIG. 1A comprises two mutually associated tools, which are rollers 2A, 2B. The rollers 2A, 2B are rotatably mounted and each have an axis of rotation 3A, 3B. In the tool set 1 shown in FIG. 1A, the axes of rotation 3A, 3B of the two rollers 2A, 2B are arranged parallel to one another. The rollers 2A, 2B each have a circumferential pressure face 4A, 4B in the circumferential direction with a contour 5A, 5B for shaping metal strips. The contours 5A, 5B of the two rollers 2A, 2B are in the form of an arc of a circle and change their shape in the circumferential direction periodically between a minimum radius $R_{min}$ and a maximum radius $R_{max}$. These are concave, that is to say inward-curved contours 5A, 5B. The contours 5A, 5B each extend approximately along a semicircle, such that both contours 5A, 5B together result in a fully circumferential-circular-overall contour. As a consequence of the arrangement of the two rollers 2A, 2B and of the shape of the two contours 5A, 5B, there forms between the two contours 5A, 5B of the mutually associated rollers 2A, 2B an opening 6 through which the metal strips to be shaped are fed. The shape of the contours 5A, 5B therefore determines the cross-sectional shape of the workpieces or profiles after shaping. It is therefore possible, using the tool set 1 shown in FIG. 1A, to produce metal strips having a circumferential, circular cross section whose diameters vary periodically between a diameter $D_{min}$ (=$2 \times R_{min}$) and $D_{max}$ (=$2 \times R_{max}$). The two rollers 2A, 2B can touch in the region of a contact plane 7.

Figure 1B:
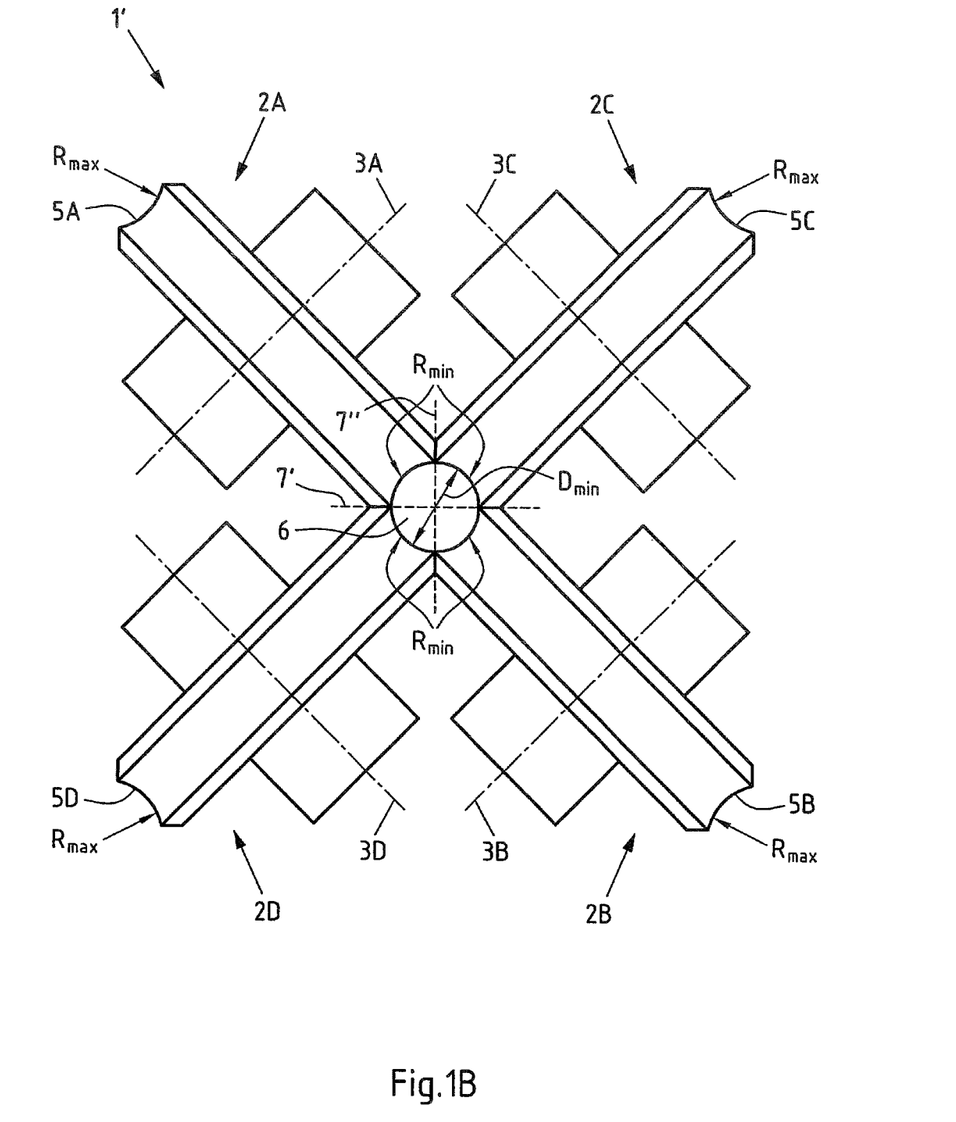
FIG. 1B is a front end plan view of an alternate second embodiment of a tool set for an apparatus of the present disclosure, showing four rollers with each roller having a circumferential pressure face that varies in shape about the length of the circumference of each roller.

FIG. 1B shows a second configuration of a tool set 1' for an apparatus according to the invention. Those regions of the tool set 1' already described with reference to FIG. 1A are provided in FIG. 1B with corresponding reference signs. The essential difference between the first configuration of the tool set 1 and the second configuration of the tool set 1' lies in the fact that the tool set 1' shown in FIG. 1B comprises not two but four mutually associated tools, which are the rollers 2A, 2B, 2C, 2D. In the tool set 1' shown in FIG. 1B, the axes of rotation 3A, 3B of the two rollers 2A, 2B are, as before, arranged parallel to one another. The axes of rotation 3C, 3D of the two additional rollers 2C, 2D are also arranged parallel to one another. However, these axes of rotation 3C, 3D run at right angles (90°) to the other two axes of rotation 3A, 3B. In this configuration, too, the contours 5A, 5B, 5C, 5D of the four rollers 2A, 2B, 2C, 2D are in the form of an arc of a circle and change their shape in the circumferential direction periodically between a minimum radius $R_{min}$ and a maximum radius $R_{max}$. These are once again concave, that is to say inward-curved contours 5A, 5B, 5C, 5D. Since four contours 5A, 5B, 5C, 5D are now present, each contour 5A, 5B, 5C, 5D extends approximately over a quarter-circle, such that the four contours 5A, 5B, 5C, 5D together result in a fully circumferential-circular-overall contour. As a consequence of the arrangement of the four rollers 2A, 2B, 2C, 2D and of the shape of the four contours 5A, 5B, 5C, 5D, there forms between the four contours 5A, 5B, 5C, 5D, in this configuration, too, an opening 6 through which the metal strips to be shaped are fed. By virtue of the circular shape of the opening 6, the tool set 1' shown in FIG. 1B can also be used to produce workpieces having a circumferential, circular cross section whose diameters vary periodically between a diameter $D_{min}$ (=$2 \times R_{min}$) and $D_{max}$ (=$2 \times R_{max}$). The four rollers 2A, 2B, 2C, 2D can touch in the region of two contact planes 7', 7".

Figure 2A:
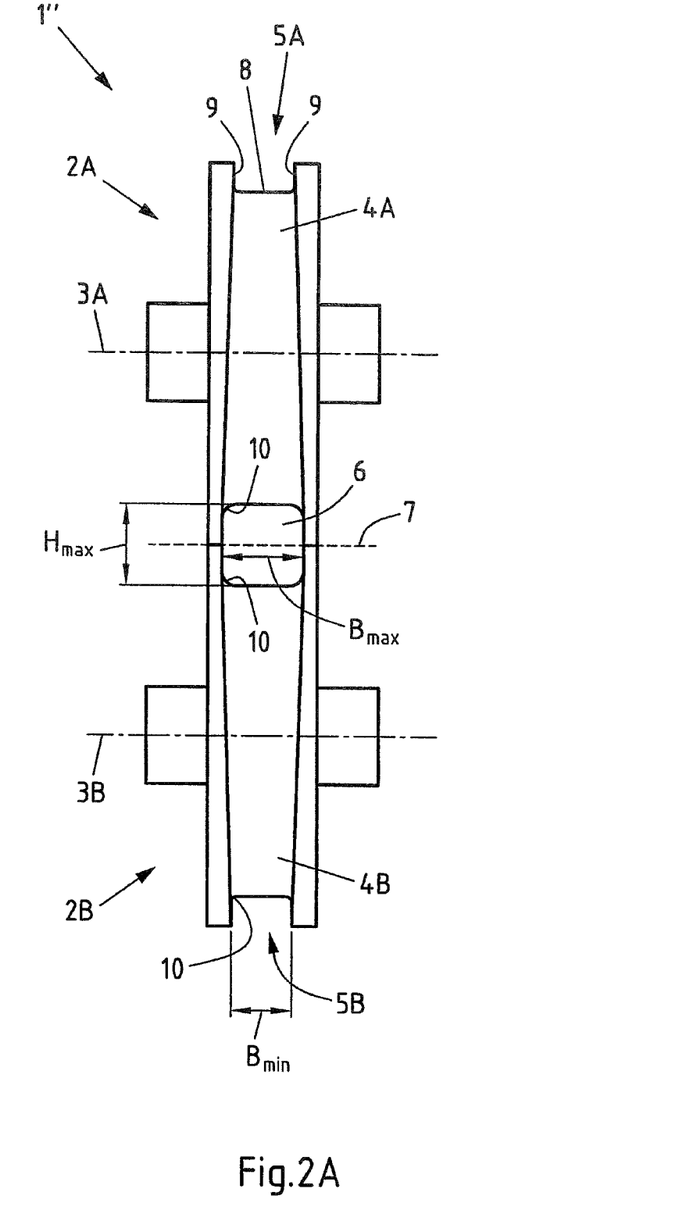
FIG. 2A is a front end plan view of an alternate third embodiment of a tool set for an apparatus of the present disclosure, showing two rollers with each roller having a circumferential pressure face that varies in shape about the length of the circumference of each roller.

FIG. 2A shows a third configuration of a tool set 1" for an apparatus according to the invention. Those regions of the tool set 1" already described with reference to FIG. 1A and FIG. 1B are also provided in FIG. 2A, with corresponding reference signs. The essential difference between the first two configurations and the third configuration of the tool set 1" lies in the fact that the tool set 1" shown in FIG. 2A produces workpieces with a rectangular, in particular square cross section whose breadth varies periodically between a breadth $B_{min}$ and a breadth $B_{max}$. In order to achieve this cross section shape, the pressure faces 4A, 4B have U-shaped contours 5A, 5B instead of contours in the form of an arc of a circle. These contours 5A, 5B comprise a circumferential base surface 8 and two mutually opposing side surfaces 9, wherein a right angle (90°) results between the base surface 8 and the two side surfaces 9. The distance between the two side surfaces 9 is termed the breadth and varies periodically between a breadth $B_{min}$ and a breadth $B_{max}$. The same holds for the height, that is to say the distance between the base surfaces 8 of the two rollers 2A, 2B, which varies periodically between a height $H_{min}$, and a height $H_{max}$. Radiuses 10 are provided between the base surfaces 8 and the side surfaces 9, which radiuses can lie in the range between 0.3 mm and 6 mm, in particular between 0.4 mm and 4 mm, preferably between 0.5 mm and 3 mm.

Figure 2B:
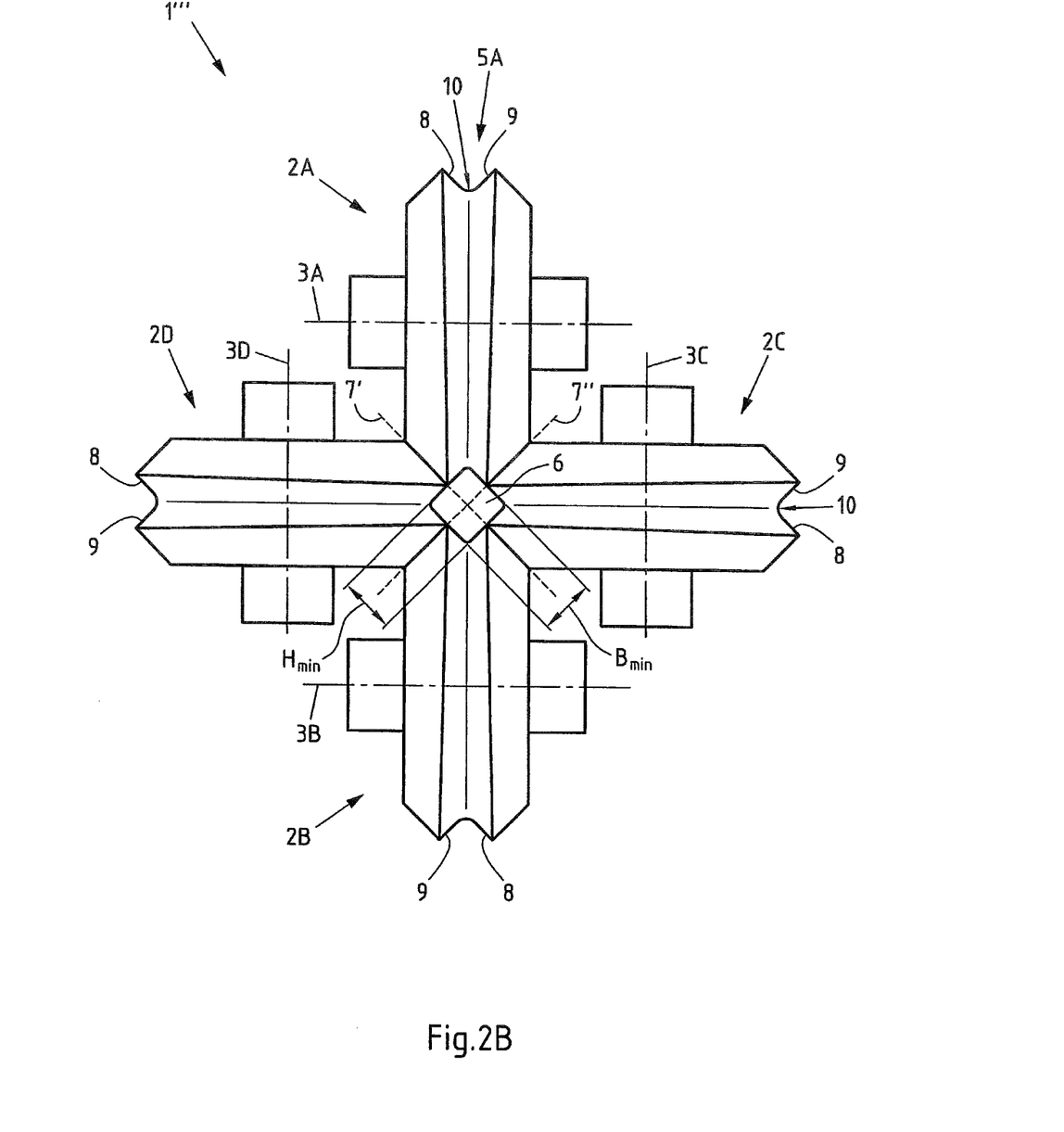
FIG. 2B is a front end plan view of an alternate fourth embodiment of a tool set for an apparatus of the present disclosure showing four rollers with each roller having a circumferential pressure face that varies in shape about the length of the circumference of each roller.

FIG. 2B shows a fourth configuration of a tool set 1''' for an apparatus according to the invention. Those regions of the tool set 1''' already described with reference to FIG. 1A to FIG. 2A are also provided in FIG. 2B, with corresponding reference signs. The essential difference between the third configuration of the tool set 1" and the fourth configuration of the tool set 1' lies in the fact that the tool set 1''' shown in FIG. 2B comprises not two but four mutually associated tools, which are the rollers 2A, 2B, 2C, 2D. In the tool set 1''' shown in FIG. 2B, the axes of rotation 3A, 3B of the two rollers 2A, 2B are, as before, arranged parallel to one another. The axes of rotation 3C, 3D of the two additional rollers 2C, 2D are also arranged parallel to one another. However, these axes of rotation 3C, 3D run at right angles (90°) to the other two axes of rotation 3A, 3B. The tool set 1' shown in FIG. 2B is also intended for the production of workpieces with a rectangular, in particular square cross section. To that end, the contours 5A, 5B, 5C, 5D each comprise a circumferential base surface 8 and a circumferential side surface 9, wherein a right angle (90°) results between the base surface 8 and the side surfaces 9. In this configuration, too, the breadth of the base surfaces 8 and the height of the side surfaces 9 vary periodically, such that the opening 6 has a breadth that varies periodically between a breadth $B_{min}$ and a breadth $B_{max}$, and a height that varies periodically between a height $H_{min}$ and height $H_{max}$.

In all of the configurations shown above, the smallest radius $R_{min}$ can lie in the range between 5 mm and 10 mm and the largest radius $R_{max}$ can lie in the range between 200 mm and 500 mm. In addition, the smallest breadth $B_{min}$ can lie in the range between 5 mm and 10 mm and the largest breadth $B_{max}$ can lie in the range between 200 mm and 500 mm. Finally, the smallest height $H_{min}$ can lie in the range between 5 mm and 10 mm and the largest height $H_{max}$ can lie in the range between 200 mm and 500 mm.

Figure 3:
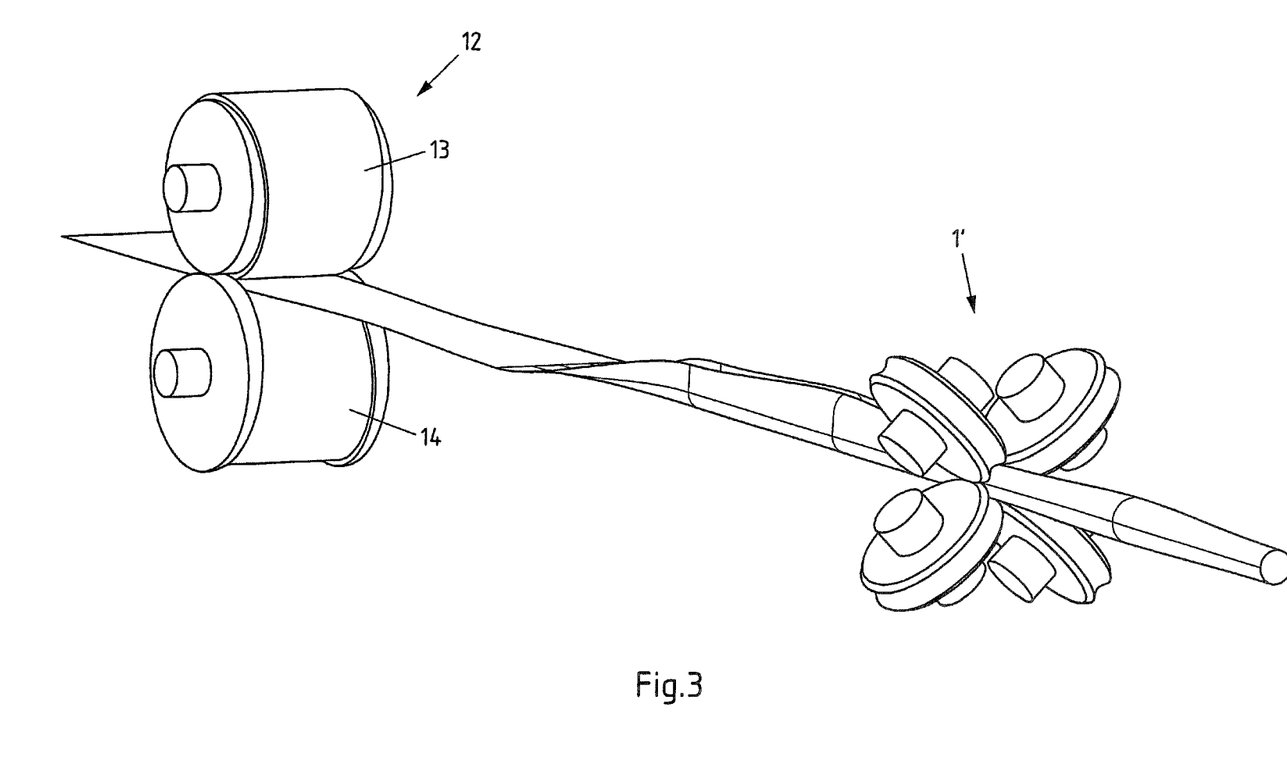
FIG. 3 is an isometric view of the tool set of FIG. 1B during shaping of a metal strip.

FIG. 3 shows the tool set 1' from FIG. 1B during shaping of a metal strip 11 to give a closed metal strip (profile strand). The metal strip 11 is first unwound from a coil (not shown here) and is fed into a straightening machine (not shown here) for straightening the metal strip. In the next step, the metal strip 11 is fed through a device 12 for cutting, where it is cut. In particular, the breadth of the metal strip is adjusted. The device 12 comprises a blade roller 13 and a support roller 14. The trimmed metal strip 11 is then shaped to give a profile that is open on one side, wherein preferably first the smallest radius and/or the at least partially smallest half cross section dimension of the final geometry is shaped into the longitudinally invariant profile open on one side. The tools used in this context are not shown in FIG. 3, but this step can for example be performed using one of the methods described in the introduction and known from the prior art. The profiles open on one side are subsequently shaped, using the inventive tool set 1', to give a closed profile (closed metal strip) having a longitudinal slot. After this step, the profile can be welded along the longitudinal slot and, where necessary, further shaped and cut to length (neither of which is shown in FIG. 3). The result is a symmetric or asymmetric closed hollow profile having a circular cross-section whose diameter varies periodically along the length of the hollow profile ("conical profile").

Figure 4:
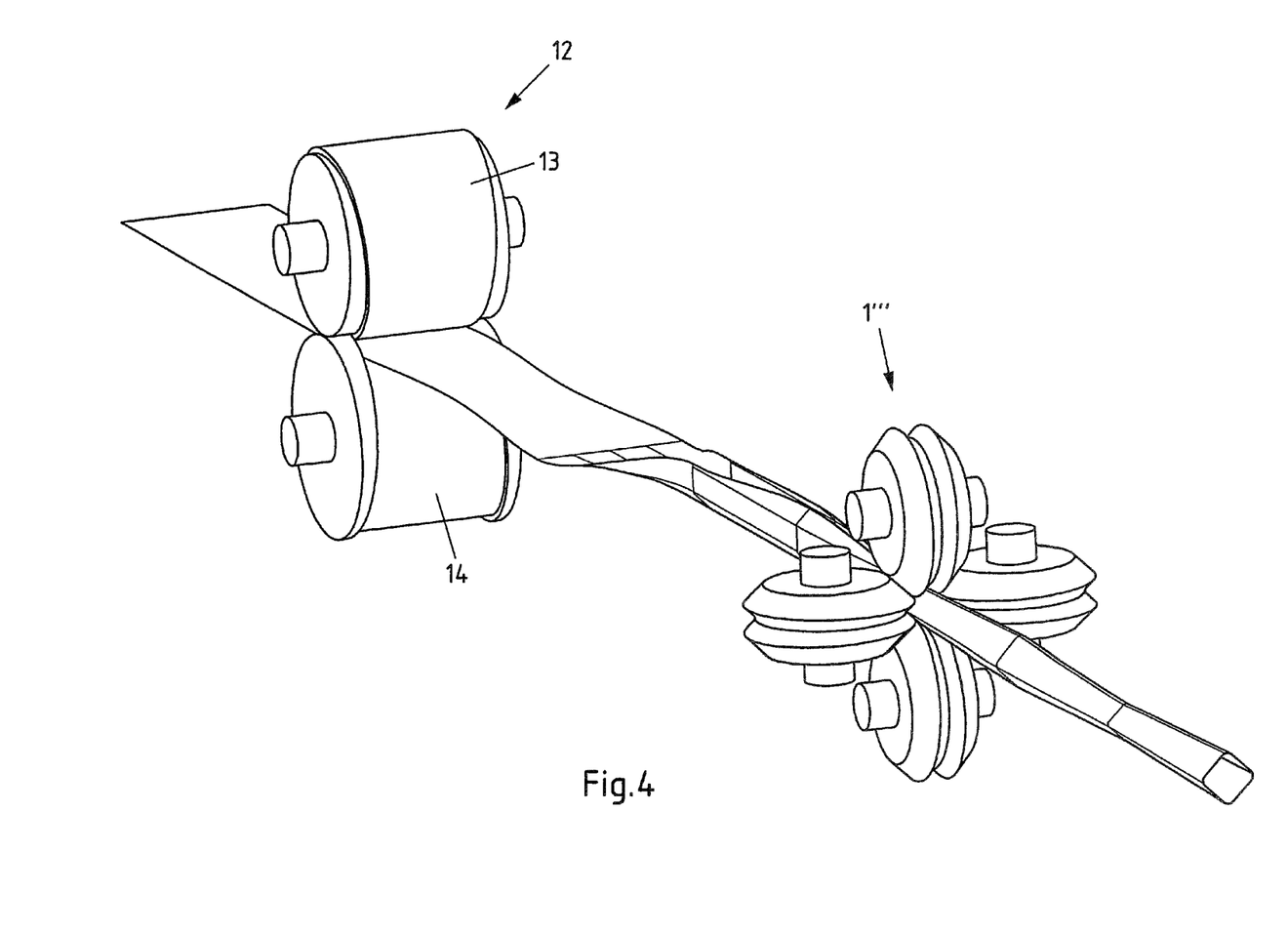
FIG. 4 is an isometric view of the tool set of FIG. 2B during shaping of a metal strip.

FIG. 4 shows the tool set from FIG. 2B during shaping of a metal strip. The essential difference with respect to FIG. 3 lies in the fact that a different tool set is used. The effect of this is that the result is a symmetric or asymmetric closed hollow profile having a square cross section whose height and breadth vary periodically along the length of the hollow profile ("quadrilateral profile").

Figure 5:
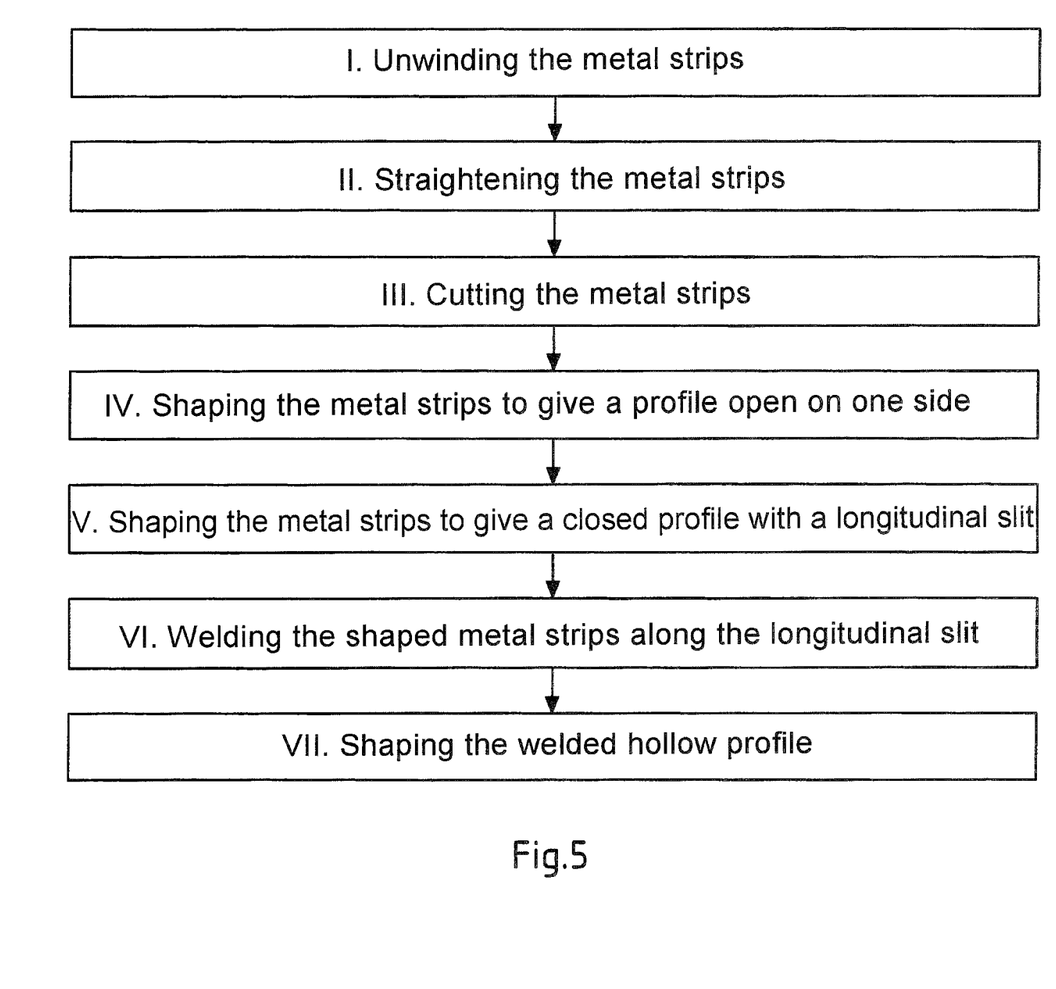
FIG. 5 is a schematic flow chart depicting a sequence of steps according to an embodiment of a method of the present disclosure.

FIG. 5 finally shows, schematically, the sequence of a method according to the invention. According to the (optional) step I, the metal strips are first unwound. This is in particular necessary in the case of metal strips wound onto coils. Then, in step II, the metal strips are straightened, which is also merely an optional step. The purpose of this is so that the subsequent steps may be carried out with particular precision. Then, in step III, the metal strips are cut, which can for example be carried out using the above-described device 12 having a blade roller 13 and a support roller 14. This step is also merely optional as it need be carried out only if the dimensions of the metal strip provided do not fit with the final geometry to be achieved. In the subsequent steps IV and V, the metal strips are shaped, involving first shaping to give a longitudinally invariant profile open on one side (step IV), wherein preferably first the smallest radius and/or the at least partially smallest half cross section dimension of the final geometry is shaped into the profile open on one side, followed by shaping to give a closed, longitudinally varying profile (closed metal strip) having a longitudinal slot (step V). After shaping, the closed metal strips having a longitudinally varying cross-section can be welded along the longitudinal slot (step VI). This step is also merely optional as alternatively other joining methods such as adhesive bonding methods can be used. It is finally—also optionally—possible to shape/post-shape the welded hollow profile (step VII). Using either subsequent shaping, it is possible to ensure a particularly precise final geometry, since undesirable deformations—which may have arisen during welding—can be corrected, or the final matching to the final geometry is carried out in the event that this is possible only in the closed and welded (fully closed) state.

What is claimed is:

1. An apparatus for shaping metal strips into a formed metal piece having a wave-like contour, the apparatus comprising:
   a shaping device;
   an upstream-connected device in operative communication with the shaping device and disposed upstream of the shaping device, the upstream-connected device configured to unwind and cut the metal strips, the upstream-connected device including a blade roller and a support roller for cutting the metal strips to have wave-like contours along longitudinal axes of the metal strips; and
   at least one tool set operably disposed in said shaping device and configured to shape the metal strips, said at least one tool set including:
      at least two mutually associated shaping tools rotatably mounted in the shaping device and configured to cooperatively work together to shape the metal strips, and
      a circumferential pressure face having an axially asymmetric contour defined in an outer circumference of each of said at least two shaping tools and configured to shape the metal strips to be fed thereby so as to conform to the shape of the contour, wherein said contours of said pressure faces of at least one of said at least one tool set are concave and are configured to produce shaped metal strips having a profile with a closed cross section.

2. The apparatus of claim 1, wherein each of said at least one tool sets includes one of two, three, or four rotatably mounted tools.

3. The apparatus of claim 1, wherein said contour of said pressure face of at least one tool in said at least one tool set is shaped as one of a section of a circle, an oval, an ellipse, or an angular shape.

4. The apparatus of claim 3, wherein a radius of said contour of said pressure face of at least one tool varies along a circumferential direction between a minimum radius ($R_{min}$) and a maximum radius ($R_{max}$).

5. The apparatus of claim 1, wherein said tools of said at least one tool set are positioned such that said pressure faces and contours thereof face each other, and together define an opening between said pressure faces through which opening the metal strips are to be passed and by which pressure faces the metal strips are to be shaped.

6. The apparatus of claim 1, further comprising a welding device in operative communication with and disposed downstream of said shaping device and configured to longitudinally weld closed the metal strips that have been formed to have a closed cross section in the shaping device.

7. The apparatus of claim 6, further comprising a post-shaping device in operative communication with and disposed downstream of said welding device and configured to post-shape the fully welded closed metal strips to a final geometry.

8. The apparatus of claim 7, further comprising a separating device in operative communication with and disposed downstream of said post-shaping device and configured to cut closed and fully formed metal strips to a desired longitudinal length.

9. A method for continuous and progressive shaping of metal strips to produce finished parts having a longitudinally varying cross section, the method comprising:

unwinding and cutting the metal strips to have wave-like contours along longitudinal axes of the metal strips using a device comprising a blade roller and a corresponding support roller;

feeding the metal strips into an apparatus; and shaping the metal strips fed into the apparatus by passing them through at least two shaping tools so as to bend sides of each of the metal strips to form a closed hollow tube having a longitudinal slot.

10. The method of claim 9, wherein said shaping step comprises:

pre-shaping each of the metal strips to have an open profile on one side and a cross-section that is dimensionally consistent along a longitudinal direction thereof, the shaped metal profile having substantially vertical legs, wherein at least one of a smallest radius or an at least partially smallest half cross section dimension of a final geometry is introduced to each of the metal strips; and final shaping each of the metal strips to bring the vertical legs of the open profile together to form a closed hollow profile having a longitudinal slot defined along a length thereof.

11. The method of claim 10, wherein said pre-shaping step is performed on a first tool set and said final shaping step is performed on a second tool set, each of the first and second shaping tool sets including two mutually associated and rotatably mounted tools.

12. The method of claim 9, further comprising, after said shaping step, welding closed a longitudinal slot present along a length of the metal strips after performance of said shaping step.

13. The method of claim 9, further comprising, after said welding step:

post-shaping the welded metal strips with at least two mutually associated and rotatably mounted tools in a subsequent tool set; and cutting the post-shaped metal strips into predefined lengths.

14. The apparatus of claim 1, wherein the support roller and the blade rollers have corresponding undulating edges for cutting longitudinal axes of the metal strips.

* * * * *